US008032645B2

(12) United States Patent
Ono et al.

(10) Patent No.: US 8,032,645 B2
(45) Date of Patent: Oct. 4, 2011

(54) CODING METHOD AND CODING APPARATUS

(75) Inventors: Kojiro Ono, Moriguchi (JP); Takashi Katayama, Hirakata (JP); Yoshiaki Takagi, Yokohama (JP); Yasuhito Watanabe, Yokohama (JP)

(73) Assignee: Panasonic Corporation, Osaka (JP)

( * ) Notice: Subject to any disclaimer, the term of this patent is extended or adjusted under 35 U.S.C. 154(b) by 1121 days.

(21) Appl. No.: 10/546,524

(22) PCT Filed: Nov. 4, 2004

(86) PCT No.: PCT/JP2004/016693

§ 371 (c)(1),
(2), (4) Date: Aug. 23, 2005

(87) PCT Pub. No.: WO2005/048609

PCT Pub. Date: May 26, 2005

(65) Prior Publication Data

US 2006/0168305 A1    Jul. 27, 2006

(30) Foreign Application Priority Data

Nov. 13, 2003 (JP) ................................ 2003-383526

(51) Int. Cl.
*G06F 15/16* (2006.01)
(52) U.S. Cl. .......................... 709/230; 709/231; 370/474
(58) Field of Classification Search .................. 709/231, 709/230; 370/474, 476; 375/240.24, 240.26, 375/240.28; 382/235
See application file for complete search history.

(56) References Cited

U.S. PATENT DOCUMENTS

| 5,623,423 | A  | * | 4/1997  | Lipovski ........................ 708/203 |
| 6,314,542 | B1 | * | 11/2001 | Nagai et al. .................... 714/755 |
| 6,333,950 | B1 |   | 12/2001 | Karasawa |
| 6,400,767 | B1 | * | 6/2002  | Nuber et al. .............. 375/240.26 |
| 6,560,285 | B1 | * | 5/2003  | Reitmeier et al. ........ 375/240.16 |
| 6,618,396 | B1 | * | 9/2003  | Kondo et al. .................. 370/474 |
| 6,754,271 | B1 | * | 6/2004  | Gordon et al. ........... 375/240.12 |
| 6,968,567 | B1 | * | 11/2005 | Gordon et al. ................... 725/54 |

(Continued)

FOREIGN PATENT DOCUMENTS

EP    0 665 693    8/1995

(Continued)

*Primary Examiner* — Peling Shaw
*Assistant Examiner* — Ninos Donabed
(74) *Attorney, Agent, or Firm* — Wenderoth, Lind & Ponack, L.L.P.

(57) ABSTRACT

A coding apparatus generates coded data by coding inputted data in a predetermined unit basis, maps one or more units of the coded data onto a packet of fixed length and outputs the packet. The coding apparatus includes a storage unit that stores the coded data and outputs the data size of the stored coded data, and a packetization unit that maps the coded data stored in the storage unit onto the packet and outputs the header size assigned to the one or more units of the coded data and the payload size of the packet. The coding apparatus also includes a control unit that generates the control information based on the data size of the outputted coded data, the header size and the payload size and outputs the control information, and a coding unit that generates the coded data by calculating an outer candidate value that makes the data size of the coded data to be mapped onto the packet an integral multiple of the payload size of the packet based on the outputted control information and coding the predetermined units of inputted data up to the outer candidate value.

15 Claims, 7 Drawing Sheets

U.S. PATENT DOCUMENTS

| | | | |
|---|---|---|---|
| 7,020,205 B1 * | 3/2006 | Beyers et al. | 375/240.26 |
| 7,058,965 B1 * | 6/2006 | Gordon et al. | 725/39 |
| 7,174,182 B2 * | 2/2007 | Toono | 455/522 |
| 7,292,781 B1 * | 11/2007 | Ito et al. | 386/96 |
| 7,305,170 B2 * | 12/2007 | Okada et al. | 386/68 |
| 7,403,565 B2 * | 7/2008 | Reitmeier et al. | 375/240.16 |
| 7,864,748 B2 * | 1/2011 | Moldestad et al. | 370/351 |
| 2001/0050954 A1 | 12/2001 | Gautier et al. | |
| 2002/0003811 A1 | 1/2002 | Herrmann | |
| 2002/0018643 A1 * | 2/2002 | Okada et al. | 386/95 |
| 2002/0115465 A1 * | 8/2002 | Komatsu | 455/522 |
| 2003/0081776 A1 * | 5/2003 | Candelore | 380/200 |
| 2003/0137994 A1 * | 7/2003 | Kikuchi | 370/474 |
| 2003/0231617 A1 * | 12/2003 | Ubale | 370/352 |
| 2003/0235400 A1 * | 12/2003 | Nakai | 386/69 |
| 2004/0091247 A1 * | 5/2004 | Shimomura et al. | 386/95 |
| 2004/0170162 A1 * | 9/2004 | Hung | 370/389 |
| 2004/0213206 A1 * | 10/2004 | McCormack et al. | 370/352 |

FOREIGN PATENT DOCUMENTS

| | | |
|---|---|---|
| JP | 2001-292448 | 10/2001 |
| WO | 03/041326 | 5/2003 |

* cited by examiner

| 131 | 169 | 182 | 133 | 179 | 179 |

FIG. 9B

| 131 | 169 | 182 | 133 | 167 | 167 |

CODING METHOD AND CODING APPARATUS

TECHNICAL FIELD

This present invention relates to the coding method and the coding apparatus of audio data and video data in the digital broadcasting and communication field, and especially to a technique for improving transmission efficiency of the coded data.

BACKGROUND ART

Some conventional coding apparatuses (encoders) that improve transmission efficiency of coded data determine a quantization width based on buffer amount (for example, refer to document 1).

Figure 1:
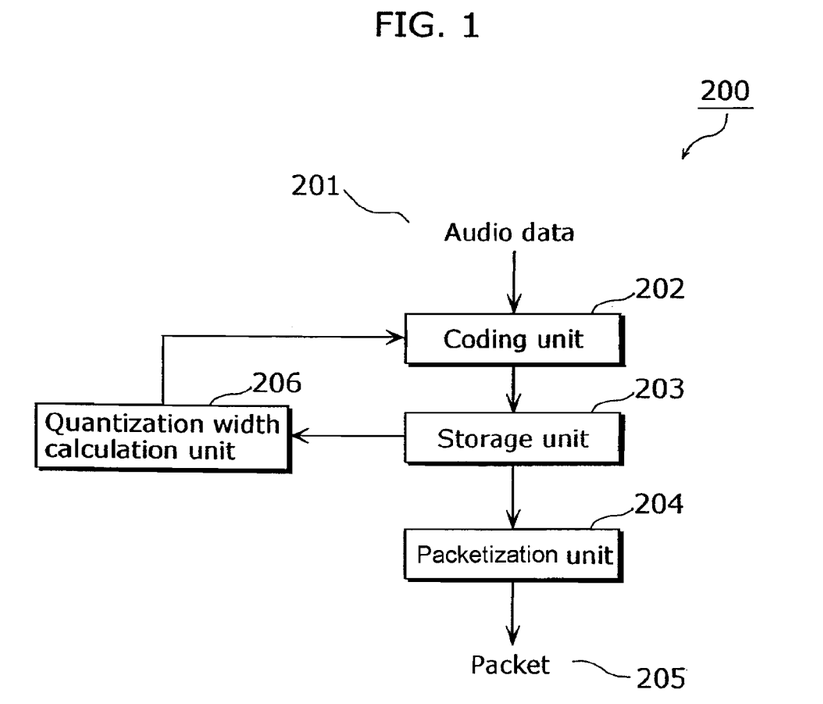
FIG. 1 is a block diagram showing the structure of a conventional encoder.

FIG. 1 is a block diagram showing the structure of a conventional encoder (coding apparatus) described in the above-mentioned document.

As shown in FIG. 1, a conventional audio encoder 200 includes a coding unit 202, a packetization unit 204, a quantization width calculation unit 206 and the like.

The coding unit 202 receives an input of audio data 201 and calculates coded data size inside. The coding unit 202 generates coded data in a way that the coded data falls within the calculated coded data size, and the generated coded data is stored in the sequential storage unit 203. The data stored in the storage unit 203 is divided into packets 205 by the packetization unit 204. The storage unit 203 transfers the stored data size to the quantization width calculation unit 206, and the quantization width calculation unit 206 transfers the quantization width to the coding unit 202.

In the case where the size of the coded data outputted by the coding unit 202 is variable length, the total size of the data stored in the storage unit 203 is also variable length.

Figure 2:
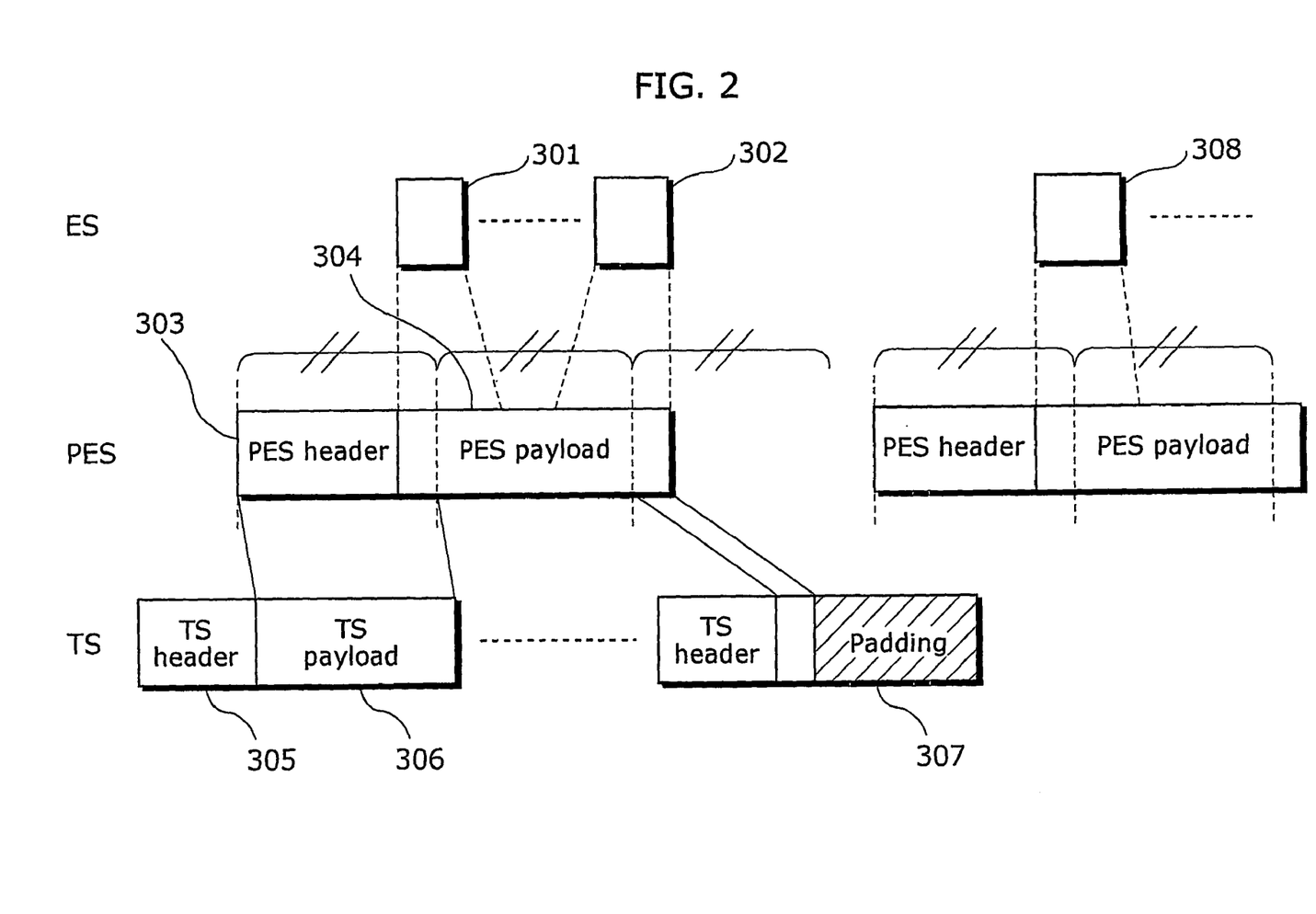
FIG. 2 is a key map showing the deterioration of the transmission efficiency in a conventional audio encoder.

The procedure at the time of dividing the data stored by the storage unit 203 will be shown in FIG. 2.

The coded data stored by the storage unit 203 is called as elementary stream (abridged as ES from here). As to audio data, ESs are made in a plurality of audio frames 301, 302 and 308.

Next, these ESs are converted into a packetized elementary stream (abridged as PES). ESs are converted into PESs by adding a PES header 303 to ESs, and the whole is called as PES packet. In the PES packet, the data part stored by the storage unit 203 is called PES payload 304. This PES packet is converted into a transport stream (called TS from here). This PES packet is divided into fixed lengths, and the TS header 305 is added to each of the packets so as to make each of the corresponding TS packets. A TS payload 306 follows the TS header. In mapping from an ES to a PES or a TS, there may be a case of mapping an integer number of audio frames onto a single PES packet and mapping in a way that a single audio frame is not divided into plural PES packets, and also, mapping in a way that a single TS packet is not divided into plural PES packets with a view to making it easier to access on an audio frame basis as shown in FIG. 2.

Japanese Laid-Open Patent application No. 2001-292448 publication.

However, in a conventional audio encoder, in the above-mentioned case, there is a case where padding 307 is generated on a PES packet basis when dividing the PES packet into TS packets. Especially, percentage of the padding in the size of the PES packet becomes bigger when the size of the PES packet is small, and there emerges a problem that the transmission efficiency of the TS packets decreases.

Also, it is possible to improve the transmission rate of the TS packets by changing the coded data size in order to restrain padding. However, there is a problem that sound quality deteriorates when changing coded data size, to be more specific, reducing the coded data size or always changing the coded data size during the encode processing with no restriction.

The first object of the present invention is to provide a coding apparatus that solves the above-mentioned first problem, that is, to reduce the padding data and improve the transmission efficiency.

Also, the second object of the present invention is to provide a coding apparatus that solves the above-mentioned second problem and minimize sound deterioration improving the transmission efficiency.

SUMMARY OF THE INVENTION

In order to solve the above-mentioned problem, the coding apparatus concerning the present invention generates coded data by coding inputted data in a predetermined unit basis, maps one or more predetermined units of the coded data onto a packet of fixed length and outputs the packet. The coding apparatus comprises: a storage unit operable to store the coded data and output a data size of the stored coded data; a packetization unit operable to map the coded data stored in the storage unit onto the packet and output a header size and a payload size of the packet assigned to one or more units of the coded data; a control unit operable to generate control information based on the data size of the outputted coded data, the header size and the payload size, and output the control information; and a coding unit operable to calculate an outer candidate value that makes the data size of the coded data to be mapped onto the packet become an integral multiple of the payload size of the packet based on the outputted control information, and code the predetermined units of inputted data up to the outer candidate value so as to generate the coded data.

In this way, it is possible to restrain padding of packets and improve the transmission efficiency by feeding back the information such as the size of the data stored by the storage unit, the packet size of the packetization unit and the like and adjusting the size of the coded data.

Also, in the coding apparatus concerning the present invention, the packetization unit may output a flag for judging timing for calculating the outer candidate value, the control unit may generate the control information including the outputted flag, and the coding unit may generate the coded data up to the outer candidate value in the case where the flag is ON.

Also, in the coding apparatus concerning the present invention, the packetization unit turns the flag ON before the data size of the coded data to be mapped onto the packet becomes the integral multiple of the payload size of the packet.

Also, in the coding apparatus concerning the present invention, the coding unit previously calculates an inner candidate value that is a unique coded data size at the time of coding, judges which of the inner candidate value and the outer candidate value should be used and generates the coded data up to the candidate value determined by the judgment.

Also, in the coding apparatus concerning the present invention, the coding unit generates the coded data up to the inner candidate value in the case where a ratio of difference between an inner candidate value and an outer candidate value to the inner candidate value exceeds a threshold.

Also, in the coding apparatus concerning the present invention, the inputted data is audio data, the coded data is an elementary stream of MPEG audio, and the packet of fixed length composes an MPEG transport stream.

Also, in the coding apparatus concerning the present invention, the inputted data is video data, the coded data is an elementary stream of MPEG video, and the packet of fixed length composes an MPEG transport stream.

As shown from the above-mentioned explanation, according to the coding apparatus of the present invention, it becomes possible to restrain the number of cases where padding occupies the most part at the time of dividing packets, and improve the transmission efficiency.

Also, in the case of changing the coded data size, to be more specific, the reduction of the data size exceeds the threshold value, not changing the coded data size can avoid sound deterioration.

Also, it is possible to minimize sound deterioration because coded data size is changed only at a specific timing.

Therefore, this present invention can improve the transmission efficiency and minimize the deterioration of sound, and the present invention is highly practical today where digital broadcasting, the content distribution by the Internet and the like have been become popular.

Note that the present invention cannot only be realized as this coding apparatus, but also as an integrated circuit including characteristic units of this coding apparatus, a coding method making these characteristic units of this coding apparatus become steps, and a program that causes a computer to execute these steps. In addition, the program can be distributed via a recording medium such as a CD-ROM.

Further Information about Technical Background to this Application

The disclosure of Japanese Patent Application No. 2003-383526 filed on Nov. 13, 2003 including the specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the drawings.

BEST MODE FOR CARRYING OUT THE INVENTION

The embodiment of the present invention will be explained in detail with reference to the figures below.

Figure 3:
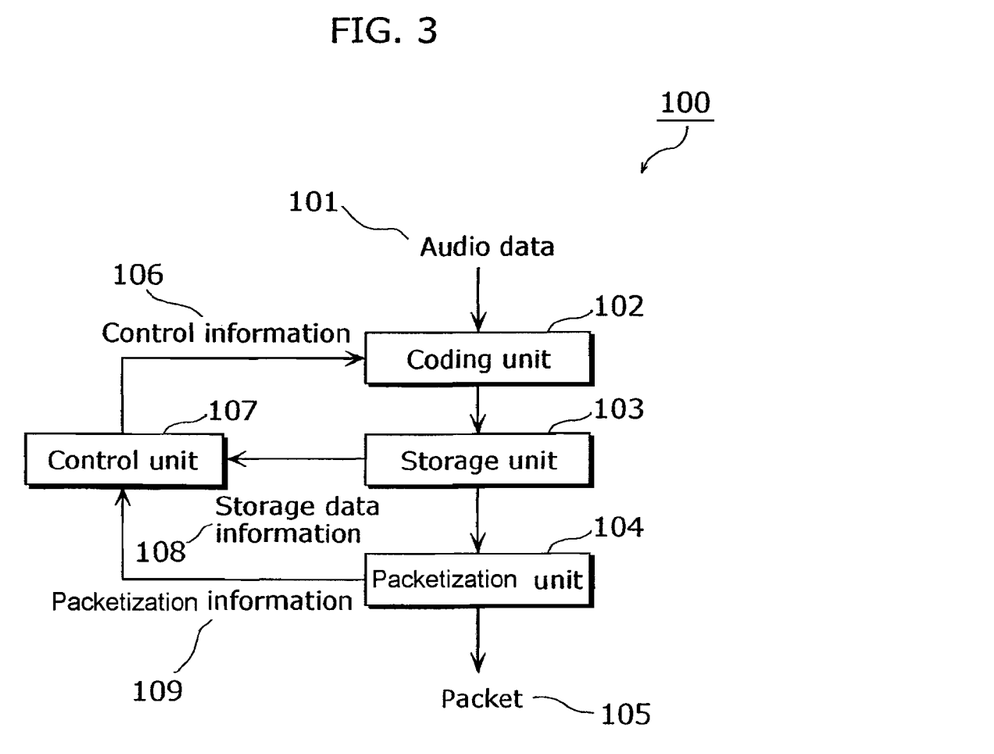
FIG. 3 is a block diagram showing the functional structure of the audio encoder concerning the embodiment of the present invention.

FIG. 3 is a block diagram showing the functional structure of an audio encoder (coding apparatus) concerning the embodiment of the present invention.

As shown in FIG. 3, the coding apparatus (audio encoder) 100 includes a coding unit 102, a storage unit 103, a packetization unit 104, a control unit 107 and the like. Note that the audio data 101 and the packet 105 are the same as the conventional ones and their explanations will be omitted.

The coding unit 102 generates audio frame data from the audio data to be inputted and coded data by coding the audio frame data based on control information 106 from the control unit 107.

Figure 5:
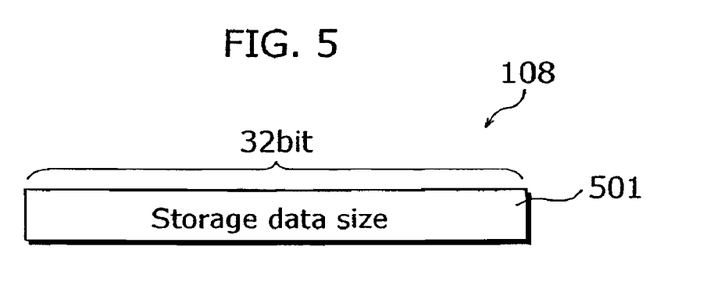
FIG. 5 is a diagram showing the structural example of the data structure of the storage data information shown in FIG. 3.

The storage unit 103 includes a buffer for storing audio frame data and coded data or a unit for obtaining the size of the stored audio frame. Also, the size of the audio frame stored in the storage unit 103 is transferred from the storage unit 103 to the control unit 107 as storage data information 108. The structural example of the storage data information 108 will be shown in FIG. 5. The storage data information 108 is composed of a storage data size 501 and the like as shown in FIG. 5.

The packetization unit 104 transmits, to the control unit 107, a flag indicating the timing for dividing coded data stored by the storage unit 103 into packets in packetization information 109, which also includes the size of the packet 105 and the like. The structural example of the packetization information 109 will be shown in FIG. 4.

Figure 4:
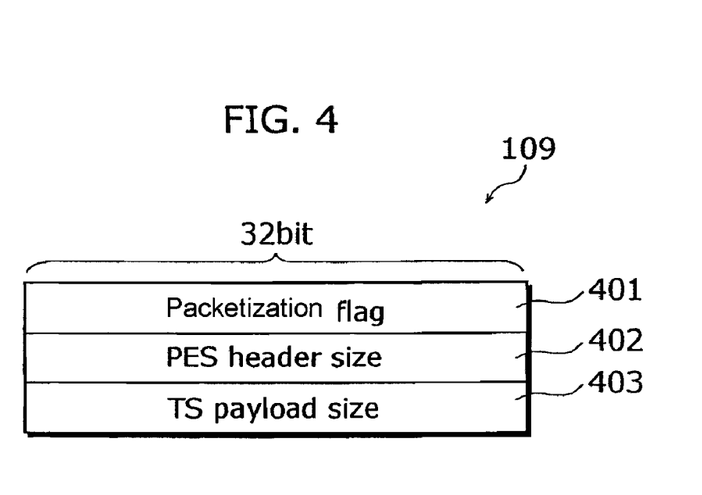
FIG. 4 is a diagram showing the structural example of the data structure of the packet information shown in FIG. 3.

The packetization information 109, as shown in FIG. 4, includes a packetization flag 401 that shows the timing for dividing the coded data into packets, a PES header size 402, a TS payload size 403 and the like.

Figure 6:
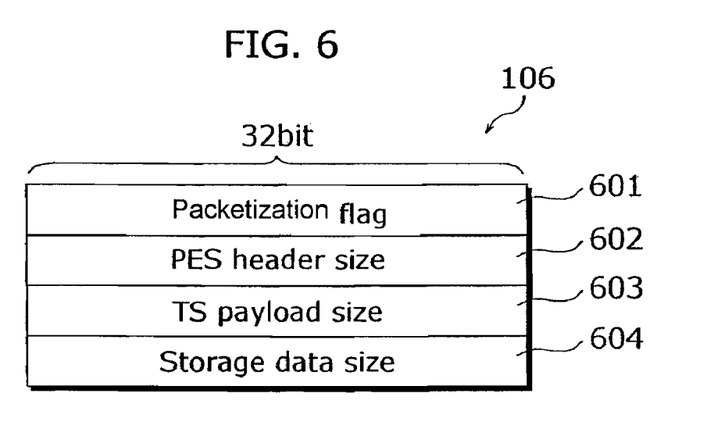
FIG. 6 is a diagram showing the structural example of the data structure of the control information shown in FIG. 3.

The control unit 107 generates the control information 106 based on the storage data information 108 and the packetization information 109 and communicates the generated control information 106 to the coding unit 102. The structural example of the control information will be shown in FIG. 6. The control information 106 includes a combination of a packetization information 109 and a storage data information 108. In other words, the control information 106, as shown in FIG. 6, includes a packetization flag 601, a PES header size 602, a TS payload size 603 and a storage data size 604.

Figure 7:
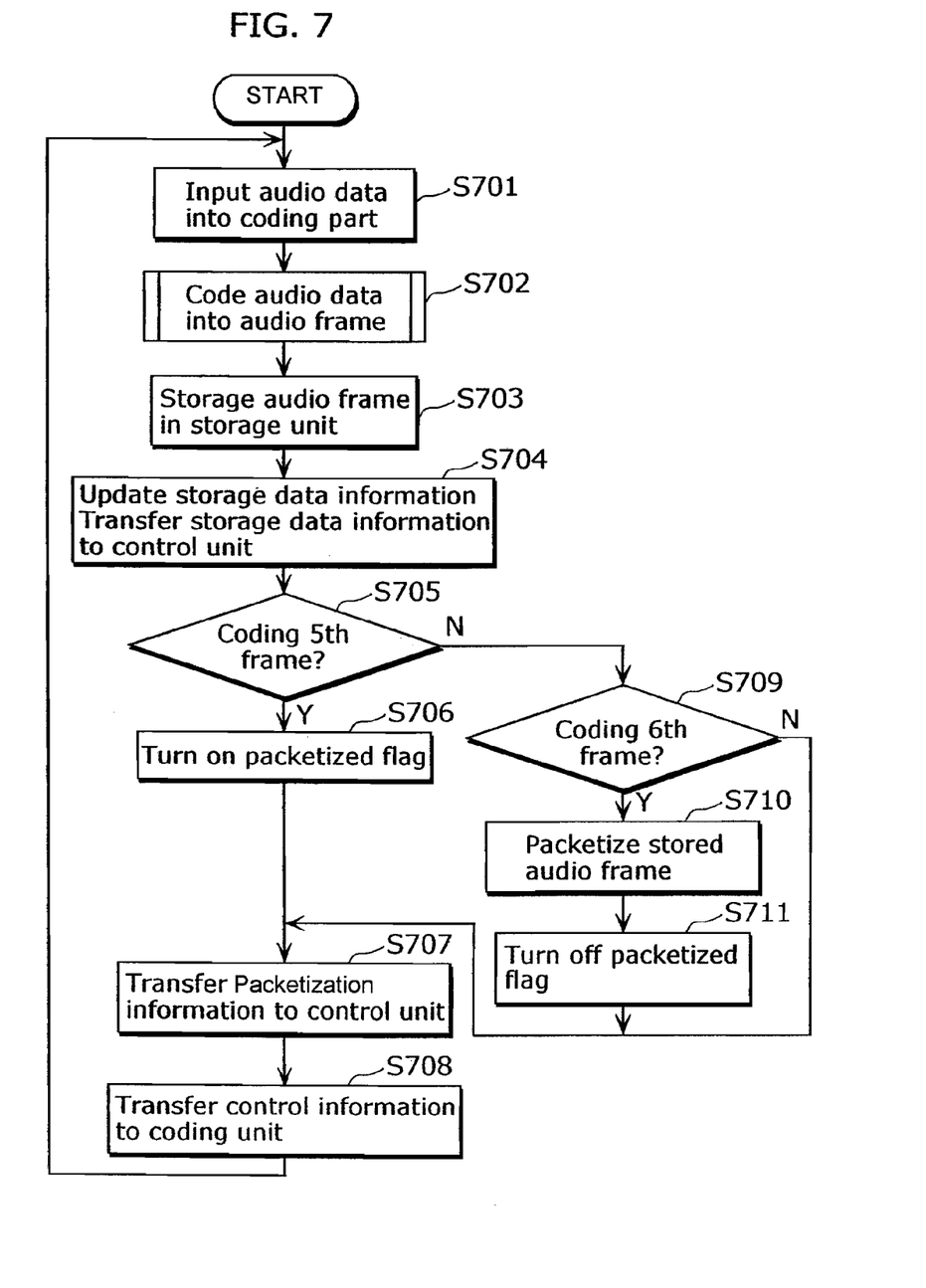
FIG. 7 is a flow chart showing an operation of the audio encoder.

Next, the procedure of packetization processing of the audio frame in the coding apparatus 100 will be explained with reference to FIG. 7.

The coding unit 102 converts the audio data 101 (S701) that is inputted first into an audio frame (S702) and stores the audio frame in the storage unit 103 (S703). At this time, the storage unit 103 updates the storage data information 108 inside (S704). After that, the storage unit 103 transmits the storage data information 108 to the control unit 107 (S704). At this time, the data size of the audio frame to be stored in a PES packet and a TS packet that are generated next is stored in the storage data information 108.

After that, when the coded data is stored in the storage unit 103, the packetization unit 104 packetizes the stored data. Also, the packetization unit 104 controls the cycle of the packetization. In this embodiment, it is assumed that packetization is performed every six audio frames. In this case, packetization is performed after these six audio frames are stored in the storage unit 103.

The packetization unit 104 transfers the packetization information 109 when the packetization flag 401 is turned ON to the control unit 107 after the phase before the packetization is finished, in other words, the 5th audio frame is stored (S705, S706 and S707). In this embodiment, in the case of "turn ON", all the 32 bit data is made to be "1". Actual packetization is performed in the next phase, that is, after the sixth audio frame is stored (S709, S710). At this time, the packetization flag 401 is turned OFF and the packetization information 109 is transmitted to the control unit 107 (S711). In this embodiment, in the case of "turn OFF", all the 32 bit data is made to be "0". After the other phases finish ("N" in S709), the packetization flag 401 is kept OFF and the packetization information 109 is transmitted to the control unit 107.

Note that, in the embodiment, a 32 bit data structure is employed as a packetization flag, all 32 bits are made to be "1" in the case of "turn ON", and all the 32 bits are made to be "0" in the case of "turn OFF". However, a 1 bit data structure may be used as a packetization flag as long as two statuses are used as an indication of a packetized flag.

The control unit 107 receives the packetization information 109 from the packetization unit 104, combines the packetization information 109 with the storage data information 108 from the storage unit 103 so as to generate the control information 106 and transmits the generated control information 106 to the coding unit 102 (S708).

After receiving the control information 106, the coding unit 102 generates the coded data by executing the coding processing of the audio frame data based on the control information 106 (S702).

Figure 8:
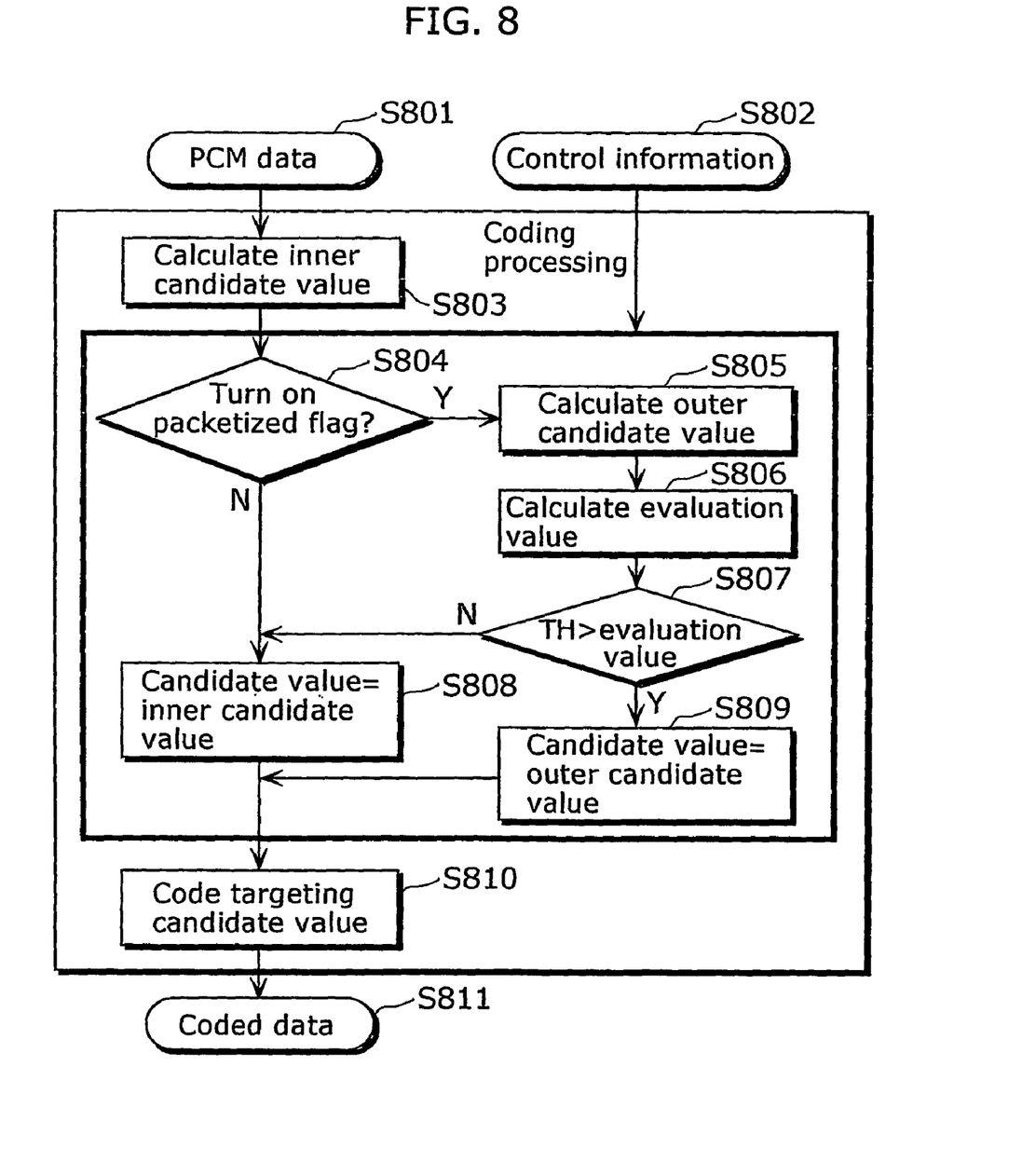
FIG. 8 is a flow chart showing a subroutine of the step S702 shown in FIG. 7.

The procedure of the coding processing using the control information in the audio encoder (detailed processing in S702) will be explained in FIG. 8.

The control unit 107 generates control information 106 from the sent packetization information 109 and the storage data information 108 and transmits the control information 106 to the coding unit 102 (S802).

The coding unit 102 inputs PCM data (S801), calculates the candid value of the coded data size at the time of outputting the audio frame and performs coding up to this size. The coding unit 102 calculates the candid value of the coded data size internally inside (S803). This candid value is called as inner candidate value (nInnerCandidateValue). Also, the coding unit 102 uses the inner candidate value as the coded data size candidate value in the case where the packetization flag 401 of the control information 106 sent from the control unit 107 is OFF (S808). In other words, inner candidate value is used for 1 to 5 frames.

On the other hand, in the case where the packetization flag is ON, the coding unit 102 calculates the candidate value of the coded data size based on the control information 106 (S805). This candidate value is called as outer candidate value (nOuterCandidateValue). In other words, outer candidate value is basically used for six frames.

As shown in formula (I), an outer candidate value is calculated by subtracting, from an inner candidate value, the remainder of dividing the total of the inner candidate value, a PES header size 602 and a storage data size 604 by a TS payload size 603. Note that, "%" in the formula (I) is an operator for calculating the surplus. In the case of calculating the outer candidate value, the coding unit 102 performs processing for determining one of the inner candidate value and the outer candidate value as the coded data size candidate value next.

$$nOuterCandidateValue = \\ nInnerCandidateValue - (nInnerCandidateValue + \\ nStockedDateSize + nPESHeaderSize)\%nTSPayloadSize \quad (1)$$

nStockedDateSize:Size of coded data presently stored in storage unit 103
nPESHeaderSize:PES header size
nTSPayloadSize:TS payload size The processing for determining the candidate value of the coded data size will be explained as follows. Initially, the coding unit 102 calculates the evaluation values.

$$dEvaluateValue=(nInnerCandidateValue-nOuterCandidateValue)/nOuterCandidateValue \quad (2)$$

dEvaluateValue:Evaluatioin Value

The coding unit 102 judges whether the evaluation value is small enough to the inner candidate value or not. This judgment is made using the threshold processing (S807). In the case where the differential value is small enough ("Y" in S807), the coding unit 102 judges that the sound deterioration is small in the case where coding is performed up to the outer candidate value, substitutes the outer candidate value into the coded data size candidate value (S809), and performs coding up to this value (S810). Note that threshold processing is performed on condition that the value of the threshold is constant, in the case where the differential slightly exceeds the threshold, it is possible to change the threshold into a larger threshold, and perform coding up to the outer candidate value.

On the other hand, in the case where the differential value is judged as big ("N" in S807), the coding unit 102 judges that the sound deterioration is remarkable in the case where coding is performed up to the outer candidate value, substitutes the inner candidate value into the coded data size candidate value (S808) and performs coding up to this value (S810).

Determining the target of the coded data size in this way, it becomes possible to perform the restriction of sound deterioration and the restriction of padding efficiently. Also, as the coded data size is changed only when the packetization flag is ON, not all the time during the encoding processing, and it is possible to minimize the number of audio frames whose data size is changed in controlling the encoding processing, and the deterioration in sound by the change of the coded data size.

Note that the form of mapping six audio frames into a single PES packet has already been explained in the embodiment, but the method for mapping the audio frames onto the PES packet is not limited to the embodiment and any mapping may be used.

Also, in this embodiment, packetization flag is turned ON at the timing when the fifth audio frame is stored, and the coded data size is changed, but the present invention is not limited to this, and a similar effect can be obtained even in the case of changing the coded data size at an arbitrary timing. In this case, changing the coded data size of only the data to be coded immediately before performing packetization makes it possible to reduce the deterioration in sound by the change of the coded data size.

Figure 9A:
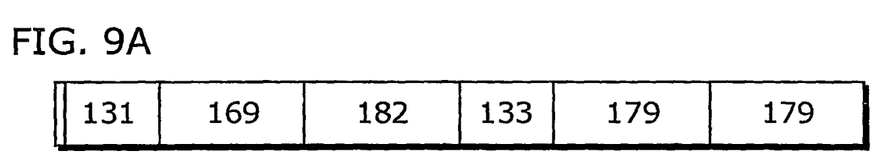
FIGS. 9A and 9B are diagrams for explaining the difference between the conventional coding processing and the decoding processing in the present invention.

Also, it is possible to change the coded data size of the fifth and the sixth audio frames in the case of an encoder whose inner candidate value of the sixth audio frame becomes equal to its inner candidate value of the fifth audio frame. In this encoder, the sizes of the fifth and the sixth audio frames are always equal to each other as shown in FIG. 9A, the packetization flag is turned ON at the timing when the fourth audio frame is stored. At this time point, frames up to the audio frame of 133 size in FIG. 9A are stored. The coding unit 102 confirms that the packetization flag is turned ON at the time of encoding next fifth audio frame, and calculates the inner candidate value of the fifth and the sixth audio frames.
nInnerCandidateValue=179

After that, as two audio frames are handled before executing the formula (I), the processing that doubles nInnerCandidateValue is added like below.

$$n\text{InnerCandidateValue} = 179 \times 2 = 358$$

Next, the formula (I) is executed like the conventional method, and the outer candidate value is calculated. Note that the PES header size is made to be 10, and the PES payload size is made to be 80.

$$\begin{aligned} n\text{OuterCandidateValue} &= 358 - (358 + 10 + 131 + 169 + 182 + 133)\%80 \\ &= 358 - 983\%80 \\ &= 358 - 23 \\ &= 335 \end{aligned}$$

At last, two audio frames are handled, the processing for dividing nOuterCandidateValue into two is added like below, this value is used for an outer candidate value of the fifth and the sixth audio frames.

$$\begin{aligned} n\text{OuterCandidateValue} &= 335/2 \\ &= 167 \end{aligned}$$

Figure 9B:
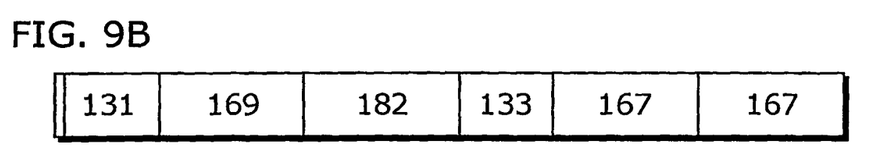

In the case where this outer candidate value is employed, the storage unit 103 becomes like FIG. 9B.

The padding becomes 57 in the case of FIG. 9A, and becomes 1 in the case of FIG. 9B.

Unlike the case where outer candidate value is used only in a single audio frame, in the case where the outer candidate value is calculated and employed in a plurality of audio frames like this, it is possible to disperse the sound deterioration in a single audio frame into plural audio frames and restrain the sound deterioration of the whole music.

Also, mapping onto the TS packet is performed on a basis of PES packet in this embodiment, padding is generated by preventing plural PES packets from being mapped onto a single TS packet, but the present invention is not limited to this. With an audio encoder that performs mapping where padding is frequently generated at the time of generating the TS packet, the same effect is obtained by using the present invention.

Also, the audio encoder has already been shown in the embodiment, the present invention is not limited to this. The present invention is applicable in a video encoder or an encoder where padding is generated at the time of mapping onto the coded data.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention may be used not only for an audio encoder and video data but also for improving the transmission efficiency in the case of transmitting the variable length frame data in a fixed length packet in the communication field.

The invention claimed is:

1. A coding apparatus comprising:
a coding unit for generating each of frames of coded data by coding inputted data;
a storage unit for storing the frames of the coded data generated by the coding unit;
a packetization unit for packetizing n (n being an integer equal to or greater than 1) of the frames of the coded data stored in the storage unit into at least one packet having a fixed length; and
a control unit for generating control information indicating a data size of all the frames of the coded data stored in the storage unit, a header size of a header assigned to the n frames of the coded data and a payload size of the packet, and outputting the control information to the coding unit,
wherein the coding unit:
judges whether or not a frame of the coded data generated by the coding unit is a specified frame of the coded data; and
when the coding unit judges that the frame of the coded data is the specified frame of the coded data:
(1) calculates an outer candidate value, which is a target value of a data size of a next frame of the coded data to be generated next, to make a sum of data sizes of the n of the frames of the coded data and the header size to be an integral multiple of the payload size of the packet, based on the payload size, the header size, and the data size of all the frames which are indicated by the control information; and
(2) determines whether or not the outer candidate value results in a differential value that is smaller than a threshold value, and
(3) when the differential value is smaller than the threshold value, generates the next frame of the coded data by adjusting the data size of the coded data so as to match the data size of the coded data to the outer candidate value.

2. The coding apparatus according to claim 1,
wherein the packetization unit outputs a flag which is ON or OFF to indicate whether or not a number of the coded data stored in the storage unit reaches m (m being an integer less than n),
the control unit generates the control information indicating the outputted flag, and
the coding unit judges that the frame of the coded data is the specified frame of the coded data and generates the next frame of the coded data by adjusting the data size of the coded data so as to match the outer candidate value as the target value when the flag is ON.

3. The coding apparatus according to claim 1,
wherein, when the coding unit judges that the frame of the coded data is not the specified frame of the coded data, the coding unit generates the next frame of the coded data by adjusting the data size of the coded data so as to match an inner candidate value that is a predetermined unique coding amount of the coded data.

4. The coding apparatus according to claim 3,
wherein the coding unit calculates the outer candidate value and generates the next frame of coded data by adjusting the data size of the coded data so as to match the inner candidate value as the target value when a ratio of difference between the inner candidate value and the outer candidate value with respect to the inner candidate value exceeds a threshold.

5. The coding apparatus according to claim 1, wherein
the inputted data is audio data,
the coded data is an elementary stream of MPEG audio, and
the packet of fixed length makes up an MPEG transport stream.

6. The coding apparatus according to claim 1, wherein
the inputted data is video data,
the coded data is an elementary stream of MPEG video, and
the packet of fixed length makes up an MPEG transport stream.

7. A coding method used by a coding apparatus, the coding method comprising:
a coding step of generating each of frames of coded data by coding inputted data;
a storing step of storing the frames of the coded data generated by the coding step in a storage unit;
a packetization step of packetizing n (n being an integer equal to or greater than 1) of the frames of the coded data stored in the storage unit into at least one packet having a fixed length; and
a control step of generating control information indicating a data size of all the frames of the coded data stored in the storage unit, a header size of a header assigned to the n frames of the coded data and a payload size of the packet, and outputting the control information,
wherein the coding step includes:
judging whether or not a frame of the coded data generated by the coding step is a specified frame of the coded data; and
when it is judged that the frame of the coded data is the specified frame of the coded data:
(1) calculating an outer candidate value, which is a target value of a data size of a next frame of the coded data to be generated next, to make a sum of data sizes of the n of the frames of the coded data and the header size to be an integral multiple of the payload size of the packet, based on the payload size, the header size, and the data size of all the frames which are indicated by the control information; and
(2) determining whether or not the outer candidate value results in a differential value that is smaller than a threshold value, and
(3) when the differential value is smaller than the threshold value, generating the next frame of the coded data by adjusting the data size of the coded data so as to match the data size of the coded data to the outer candidate value.

8. The coding method according to claim 7, wherein
the packetization step further includes outputting a flag which is ON or OFF to indicate whether or not a number of the coded data stored in the storage unit reaches m (m being an integer less than n),
in the control step, the generating comprises generating the control information indicating the outputted flag, and
in the coding step, the judging comprises judging that the frame of the coded data is the specified frame of the coded data and the generating of the next frame of the coded data comprises generating the next frame of the coded data by adjusting the data size of the coded data so as to match the outer candidate value as the target value, when the flag is ON.

9. The coding method according to claim 7,
wherein in the coding step, the generating comprises generating the next frame of the coded data by adjusting the data size of the coded data so as to match an inner candidate value that is a predetermined unique coding amount of the coded data when it is judged that the frame of the coded data is not the specified frame of coded data.

10. The coding method according to claim 9,
wherein in the coding step, when a ratio of difference between the inner candidate value and the outer candidate value with respect to the inner candidate value exceeds a threshold, the calculating comprises calculating the outer candidate value and the generating comprises generating the next frame of coded data by adjusting the size of the coded data so as to match the inner candidate value as the target value.

11. The coding method according to claim 7, wherein
the inputted data is audio data,
the coded data is an elementary stream of MPEG audio, and
the packet of fixed length makes up an MPEG transport stream.

12. The coding method according to claim 7, wherein
the inputted data is video data,
the coded data is an elementary stream of MPEG video, and
the packet of fixed length makes up an MPEG transport stream.

13. A program embodied on a non-transitory computer-readable storage medium used by a coding apparatus, the program causing the coding apparatus to execute a coding method comprising:
a coding step of generating each of frames of coded data by coding inputted data;
a storing step of storing the frames of the coded data generated by the coding step in a storage unit;
a packetization step of packetizing n (n being an integer equal to or greater than 1) of the frames of the coded data stored in the storage unit into at least one packet having a fixed length; and
a control step of generating control information indicating a data size of all the frames of the coded data stored in the storage unit, a header size of a header assigned to the n frames of the coded data and a payload size of the packet, and outputting the control information,
wherein the coding step includes:
judging whether or not a frame of the coded data generated by the coding step is a specified frame of the coded data; and
when it is judged that the frame of the coded data is the specified frame of the coded data:
(1) calculating an outer candidate value, which is a target value of a data size of a next frame of the coded data to be generated next, to make a sum of data sizes of the n of the frames of the coded data and the header size to be an integral multiple of the payload size of the packet, based on the payload size, the header size, and the data size of all the frames which are indicated by the control information; and
(2) determining whether or not the outer candidate value results in a differential value that is smaller than a threshold value, and
(3) when the differential value is smaller than the threshold value, generating the next frame of the coded data by adjusting the data size of the coded data so as to match the data size of the coded data to the outer candidate value.

14. A non-transitory computer-readable storage medium on which a program is embodied, the program being used by a coding apparatus, the program causing a computer to execute a coding method comprising:
   a coding step of generating each of frames of coded data by coding inputted data;
   a storing step of storing the frames of the coded data generated by the coding step in a storage unit;
   a packetization step of packetizing n (n being an integer equal to or greater than 1) of the frames of the coded data stored in the storage unit into at least one packet having a fixed length; and
   a control step of generating control information indicating a data size of all the frames of the coded data stored in the storage unit, a header size of a header assigned to the n frames of the coded data and a payload size of the packet, and outputting the control information,
   wherein the coding step includes:
      judging whether or not a frame of the coded data generated by the coding step is a specified frame of the coded data; and
      when it is judged that the frame of the coded data is the specified frame of the coded data:
   (1) calculating an outer candidate value, which is a target value of a data size of a next frame of the coded data to be generated next, to make a sum of data sizes of the n of the frames of the coded data and the header size to be an integral multiple of the payload size of the packet, based on the payload size, the header size, and the data size of all the frames which are indicated by the control information; and
   (2) determining whether or not the outer candidate value results in a differential value that is smaller than a threshold value, and
   (3) when the differential value is smaller than the threshold value, generating the next frame of the coded data by adjusting the data size of the coded data so as to match the data size of the coded data to the outer candidate value.

15. An integrated circuit functioning as a coding apparatus, the integrated circuit comprising:
   a coding unit for generating each of frames of coded data by coding inputted data;
   a storage unit for storing the frames of the coded data generated by the coding unit;
   a packetization unit for packetizing n (n being an integer equal to or greater than 1) of the frames of the coded data stored in the storage unit into at least one packet having a fixed length; and
   a control unit for generating control information indicating a data size of all the frames of the coded data stored in the storage unit, a header size of a header assigned to the n frames of the coded data and a payload size of the packet, and outputting the control information to the coding unit,
   wherein the coding unit:
      judges whether or not a frame of the coded data generated by the coding unit is a specified frame of the coded data; and
      when the coding unit judges that the frame of the coded data is the specified frame of the coded data:
   (1) calculates an outer candidate value, which is a target value of a data size of a next frame of the coded data to be generated next, to make a sum of data sizes of the n of the frames of the coded data and the header size to be an integral multiple of the payload size of the packet, based on the payload size, the header size, and the data size of all the frames which are indicated by the control information; and
   (2) determines whether or not the outer candidate value results in a differential value that is smaller than a threshold value, and
   (3) when the differential value is smaller than the threshold value, generates the next frame of the coded data by adjusting the data size of the coded data so as to match the data size of the coded data to the outer candidate value.

* * * * *